Patented May 8, 1951

2,551,640

UNITED STATES PATENT OFFICE 2,551,640

SYNTHETIC LUBRICANTS

Francis M. Seger, Pitman, and Charles F. Feasley and Alexander N. Sachanen, Woodbury, N. J., assignors to Socony-Vacuum Oil Company, Incorporated, a corporation of New York No Drawing. Application September 26, 1947, Serial No. 776,427

8 Claims. (Cl. 260—610)

This invention relates to a new group of compositions of matter that are particularly useful as lubricants, to a method of producing these compositions of matter, and to a method of lubricating relatively moving surfaces by their use. More particularly, this invention relates to the production of synthetic lubricants by reactions involving halogenated olefins, normal alpha-monoolefins containing from about six to about eighteen carbon atoms per molecule and organic peroxides.

Organic peroxides have heretofore been used as catalysts in the polymerization of halogenated diolefins and vinyl chloride and also in many other reactions. In no known case have halogenated olefins, normal alpha-monoolefins containing from about six to about eighteen carbon atoms per molecule and organic peroxides been allowed to react together.

In accordance with this invention, it has been found that under proper conditions the three above-mentioned reactants may be caused to react in such a manner as to form a new group of materials. These products possess low pour points, fair viscosity indices, good stability and, generally, are suitable for use as lubricants.

Reactants

The halogenated olefins of this invention are preferably polychloroethylenes, such as trichloroethylene or tetrachloroethylene. Other halogenated olefins, such as vinyl chloride, allyl chloride, methallyl chloride, and any of the mono- or poly-chloroethylenes, propylenes, butylenes, amylenes or the like may be used. The corresponding bromides, fluorides or mixed halides can also be used.

The normal alpha-monoolefin is preferably octene-1 or decene-1. Normal dodecene-1 and other normal alpha-monoolefins having not less than about six nor more than about eighteen carbon atoms per molecule, or a mixture predominantly comprised of normal alpha-monoolefins containing from about six to about eighteen carbon atoms per molecule is satisfactory. It is suspected that minor branching of the carbon chain of the alpha-monoolefins does not completely preclude their use, but extensive branching of the carbon chains should be avoided. Normal, alpha-monoolefins containing less than six carbon atoms, as well as those containing more than eighteen carbon atoms, also can be used. The synthetic products thus formed, however, will have moderate or low viscosity indices, if the number of carbon atoms is below six, or higher pour points, if the number of carbon atoms is above eighteen.

The organic peroxide is preferably dibenzoyl peroxide. Other organic peroxides, such as acetyl peroxide, lauroyl peroxide, tertiary butyl hydroperoxide and the like may be used.

In the case of each of the three reactants mentioned above, mixtures rather than single chemical compounds may be used, and commercial products comprised predominantly of the specified compounds, but containing also other non-interfering materials, are generally satisfactory.

Reaction conditions

The conditions under which the reaction is performed are determined largely by the activity of the organic peroxide.

The reactants should be present within approximately the following mol proportions:

| | |
|---|---|
| Halogenated olefins | 1.0 |
| Normal alpha-monoolefins | 0.5 to 1.5 |
| Organic peroxides | 0.01 to 0.30 |

Preferably, the mol proportions of reactants are kept within the somewhat narrower limits as follows:

| | |
|---|---|
| Halogenated olefins | 1.0 |
| Normal alpha-monoolefins | About 1.0 |
| Organic peroxides | 0.05 to 0.15 |

The reaction is accomplished by mixing the reactants and heating the mixture at a temperature of from about 50° C. to about 200° C., for a period of from about one to about twenty hours. Preferably, the temperature is maintained within the somewhat narrower limits of 75° C. to 100° C., in which case the reaction is usually completed within three to seven hours. At a temperature of about 85° C. and a time of about five hours very good results have been obtained. We have found it preferable to add the organic peroxide reactant in two or more portions.

Upon completion of the reaction, unreacted materials and by-products may be removed by any suitable combination of distillation, filtration and treatment with dilute caustic soda. Usually, the reaction product will be filtered and treated with a 10% caustic solution to remove free benzoic acid which is a by-product of the reaction and which would otherwise tend to plug up the condenser during distillation. The treated material is then topped to remove unreacted materials and products of low molecular weight from the residual oil. The oil may be treated again with caustic, if necessary, to remove traces of acidity. Finally, the oil may be dried by blowing with dry nitrogen or dry air.

It appears that the organic peroxides act not merely as catalysts, but also as reactants, for when benzoyl peroxide is used, the final products appear to contain benzene rings or benzoate groups as evidenced by high refractive index, high specific gravity, relatively low viscosity index and appreciable saponification number. For example, the chlorine analyses for the octene-trichloroethylene benzoyl peroxide products are remarkably uniform, viz., 31.6, 31.7 and 31.4 per cent chlorine being obtained on three different samples. These values agree closely with the value of 30.4% calculated for the formula:

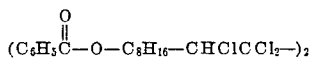

or 30.5% calculated for the formula:

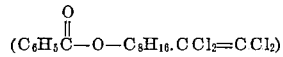

The values found do not agree with the value of 45.6% calculated for the formula:

The products of this invention contain a certain amount of a halogen or halogens from the halogenated olefins and the halogen content of these products may be controlled by varying the proportion of normal alpha-monoolefin to halogenated olefin, or by varying the type of halogenated olefin used in the reaction.

The products of this invention are useful as lubricants and many are particularly useful as extreme pressure lubricants, cutting oils, and as intermediates for the production of other chemical compositions. Also, the compositions of this invention may be blended with other known lubricating materials or addition agents, to form compounded lubricants of various types. Further details and advantages of this invention will appear from the following examples.

*Example I*

Normal octene-1, 112 g., 1.0 mol; trichloroethylene, 131.5 g., 1.0 mol; and benzoyl peroxide, 12 g., 0.05 mol, were heated for five hours at 85° C. Unreacted normal octene-1 and trichloroethylene were distilled out at 86–142° C., at atmospheric pressure. This distillate amounted to 165 g. A vacuum distillate was then taken at 66–200° C. at 5 mm. (equivalent to 206–382° C. at 760 mm.). This distillate was 36 g. (after filtering out 5 g. of benzoic acid crystals). The residue was 35 g. The uniform weight per cent of chlorine in all fractions is indicative of a reaction of one mol of olefin with one mol of halide. No cracking out of HCl was observed, even when the residue was heated to 236° C. at the end of the distillation.

The characteristics of the distillate and residue were as follows:

| | Vacuum Distillate | Residue |
|---|---|---|
| Viscosity, S. U. sec. at 100° F | 45.24 | 563.6 |
| Viscosity, S. U. sec. at 210° F | <32 | 58.39 |
| V. I. | | 48.4 |
| Chlorine, per cent by weight | 31.6 | 31.7 |
| Bromine Addition Number | 6.4 | 7.4 |
| Refractive Index | 1.4905 | Too dark |
| Neutralization Number | 21.4 | 1.75 |
| Saponification Number | 222 | 210 |

*Example II*

Normal octene-1, 336 g., 3.0 mols; trichloroethylene, 395 g., 3.0 mols; and benzoyl peroxide, 24 g., 0.1 mol, were heated at 85–90° C. for two hours. Two like portions of peroxide were added with subsequent heating periods of two hours and five hours respectively.

The acid reaction mixture was contacted with 10% NaOH at room temperature. The emulsion was broken and the separated organic layer distilled. The atmospheric distillate was 294 g. of liquid with a specific gravity of about 1.08. A vacuum distillate of 36 g. had a specific gravity of about 0.78. This was taken only to 85° C. at 8 mm., equivalent to 220° C. at 760 mm. The residue was 329 g. of liquid with a specific gravity of about 1.07. This was heated with 70 g. of 10% NaOH for three hours at 100° C. The alkaline emulsion was broken, the oily material separated and blown dry with nitrogen at 125° C. The residual oil recovered was 278 g. Its characteristics were:

| | |
|---|---|
| Viscosity S. U. sec. at 100° F | 97.46 |
| Viscosity S. U. sec. at 210° F | 37.95 |
| V. I. | 32.0 |
| Pour, ° F | Below −65 |
| Specific gravity | 1.0760 |
| Neutralization number | 1.6 |
| Chlorine, per cent by weight | 31.4 |

*Example III*

A charge of 166 grams (1.0 mol) of tetrachloroethylene, 140.25 grams (1.0 mol) of normal decene-1 and 17.5 grams (0.072 mol or 3.6 mol per cent of the charge) of dibenzoyl peroxide (added portion-wise) was held for 14 hours at 85–90° C. The reaction mixture was washed with cold 10% aqueous sodium hydroxide and with distilled water, was dried and unreacted starting materials removed by distillation leaving a residue of 66 grams having the following properties:

| | |
|---|---|
| Specific gravity | 0.9395 |
| Pour point, ° F | <−30 |
| Neutralization number | 1.3 |
| Saponification number | 63 |
| Chlorine, per cent by weight | 19.1 |
| Kinematic viscosity, centistokes: | |
| At 100° F | 22.97 |
| At 210° F | 4.28 |
| Viscosity index | 114 |

*Example IV*

A charge of 20 grams (0.1 mol) of 1,1,1-trifluoro-2,3,3-trichloropropene (CF$_3$CCl=CCl$_2$), 13 grams (0.09 mol) of normal decene-1 and 5 grams (0.02 mol or 9.1 mol per cent of charge) of dibenzoyl peroxide (added during the run in 3 portions) was held for 9 hours at 85° C. The reaction mixture was washed with 10% aqueous sodium hydroxide solution and with distilled water, was dried and distilled to remove unreacted starting materials leaving a residue of 6 grams of liquid having the following properties:

| | |
|---|---|
| Specific gravity | 0.9076 |
| Per cent chlorine | 22.6 |
| Norwood bromine number | 9.1 |
| Molecular weight | 378 |

*Example V*

Hexachlorobutadiene (62 grams or 0.24 mol), 66 grams (0.47 mol) of normal decene-1 and 18 grams (0.074 mol or 9.4 mol per cent of charge) of dibenzoyl peroxide (added during the run in 3 portions of increasing size) were stirred together for 9 hours at 85–90° C. The reaction product was washed twice with 10% aqueous sodium hydroxide solution and twice with distilled water, was dried and distilled to remove unreacted starting materials leaving 25 grams of an oil residue having the following properties:

| | |
|---|---|
| Neutralization number | 2.60 |
| Chlorine, per cent by weight | 7.90 |
| Norwood bromine number | 10.9 |
| Pour point, ° F. | <−30 |
| Kinematic viscosity, centistokes: | |
| At 100° F. | 46.52 |
| At 210° F. | 6.67 |
| Viscosity index | 104.8 |

*Example VI*

Chlorobutenes (Eastman Kodak Company) and normal decene-1 were allowed to react with benzoyl peroxide in a stainless steel bomb for five hours. The relative molar proportions of the three reactants were 1.0:1.0:0.1, respectively, or 91:140:24 grams. Temperature was held at 121–149° C. Unreacted materials were separated by distillation and the viscous residue of 45 grams had the following characteristics:

| | |
|---|---|
| Viscosity, S. U. at 210° F., sec | 54.22 |
| Viscosity index | 102.9 |
| Pour, ° F. | Below −30 |
| Bromine addition value | 35.9 |
| Specific gravity | 0.9402 |
| Chlorine, per cent | 5.55 |

The products of this invention are compatible with and compound well with natural mineral oils, and the addition agents commonly incorporated therein. They exhibit, either alone or when compounded with other materials, the characteristics of good lubricants, and many of them also exhibit the characteristics of good extreme pressure lubricants. When placed between relatively moving surfaces, they not only reduce friction as a good lubricant should, but they protect the surfaces against scoring, seizure, wear and corrosion, with a high degree of efficiency.

What is claimed is:

1. A viscous oil formed by: reacting a mixture consisting essentially of one molecular proportion of a halogenated olefin, from 0.5 to 1.5 molecular proportions of a normal alpha-monoolefin containing from about six to about eighteen carbon atoms, and from about 0.01 to 0.3 molecular proportion of an organic peroxide.

2. A viscous oil formed by: reacting a mixture consisting essentially of one molecular proportion of a halogenated olefin, from about 0.5 to 1.5 molecular proportions of a normal alpha-monoolefiin containing from about six to about eighteen carbon atoms, and from about 0.01 to 0.3 molecular proportion of an organic peroxide, at a temperature of between about 50° C. and about 200° C.

3. The method for forming a viscous oil, which comprises: reacting a mixture consisting essentially of one molecular proportion of a halogenated olefin, from about 0.5 to 1.5 molecular proportions of a normal alpha-monoolefin containing from about six to about eighteen carbon atoms, and from about 0.01 to 0.3 molecular proportion of an organic peroxide.

4. The method for forming a viscous oil, which comprises: reacting a mixture consisting essentially of one molecular proportion of a halogenated ethylene, about 0.5 to about 1.5 molecular proportions of a normal alpha mono-olefin containing from about six to about eighteen carbon atoms, and from about 0.01 to about 0.3 molecular proportion of dibenzoyl peroxide.

5. The method for forming a viscous oil, which comprises: reacting a mixture consisting essentially of one molecular proportion of trichlorethylene, approximately one molecular proportion of n-decene-1, and from about 0.05 to about 0.15 molecular proportion of dibenzoyl peroxide, at a temperature between about 75° C. and about 100° C. for a period of about three to about seven hours.

6. A viscous oil formed by: reacting a mixture consisting essentially of one molecular proportion of trichlorethylene, approximately one molecular proportion of n-decene-1, and from about 0.05 to 0.15 molar proportion of dibenzoyl peroxide, at a temperature between about 75° C. and about 100° C. for a period of about three to about seven hours.

7. The method for forming a viscous oil, which comprises: reacting a mixture consisting essentially of one molecular proportion of a halogenated olefin, from about 0.5 to 1.5 molecular proportions of a normal alpha-monoolefin containing from about six to about eighteen carbon atoms, and from about 0.01 to 0.3 molecular proportion of an organic peroxide; and thereafter purifying the product thus formed, by fractional distillation, treatment with dilute caustic soda, and filtering.

8. The method for forming a viscous oil, which comprises: reacting a mixture consisting essentially of one molecular proportion of a halogenated olefin, from about 0.5 to 1.5 molecular proportions of a normal alpha-monoolefin containing from about six to about eighteen carbon atoms, and from about 0.01 to 0.3 molecular proportion of an organic peroxide; and thereafter purifying the product thus formed, by fractional distillation, treatment with dilute caustic soda, filtering and drying.

FRANCIS M. SEGER.
CHARLES F. FEASLEY.
ALEXANDER N. SACHANEN.

REFERENCES CITED

The following references are of record in the file of this patent:

UNITED STATES PATENTS

| Number | Name | Date |
|---|---|---|
| 2,438,021 | Roland | Mar. 16, 1948 |
| 2,440,800 | Hanford | May 4, 1948 |

FOREIGN PATENTS

| Number | Country | Date |
|---|---|---|
| 581,899 | Great Britain | Oct. 29, 1946 |